Patented Apr. 30, 1946

2,399,407

UNITED STATES PATENT OFFICE 2,399,407

CHLOROPRENE POLYMERS

Frederick C. Wagner, Louisville, Ky., assignor to E. I. du Pont de Nemours & Company, Wilmington, Del., a corporation of Delaware No Drawing. Application March 14, 1944,
Serial No. 526,479

5 Claims. (Cl. 260—84.5)

This invention relates to chloroprene polymers, and more particularly to an improved method for effecting the polymerization of mixtures of chloroprene with other polymerizable materials. This application is a continuation-in-part of my application Serial No. 434,785, filed March 14, 1942.

It is known in the prior art that synthetic, rubber-like materials may be made by polymerizing chloroprene (2-chloro-1,3-butadiene). It is also known (see, for example, U. S. Patents 1,967,860, 2,029,410, 2,066,329, 2,066,330 and 2,066,-331) that the so-called interpolymers of chloroprene with certain other polymerizable compounds, that is, polymeric products in which the chloroprene and the other polymerizable compounds are presumably in chemical combination, differ from polychloroprene itself in physical and chemical properties in such a manner that they are rendered particularly desirable for special purposes. Thus, interpolymers of chloroprene and acrylic nitrile have even greater resistance than polychloroprene itself to the swelling action of materials such as petroleum hydrocarbons, while certain interpolymers of chloroprene and styrene have improved electrical properties. Unlike many cases of interpolymerization, however, the interpolymerization of chloroprene with many of these other polymerizable compounds is difficult to force to completion, and a considerable proportion (often more than half) of the second component remains unpolymerized after the chloroprene is completely used up. Thus, if the polymerization is stopped at this point, there arises either the waste of the unused portion of the second component or the expense of its recovery. If, on the other hand, the polymerization is not stopped and the second component is allowed to polymerize by itself, the interpolymers become contaminated with new polymers which, in general, cause deterioration of the properties. It is shown in U. S. application Serial Number 434,785, of which this application is a continuation-in-part, that the proportion of acrylic nitrile utilized in its interpolymerization with chloroprene may be considerably increased, with a corresponding increase in resistance to swelling by petroleum hydrocarbons, by the addition of the chloroprene to the acrylic nitrile during the polymerization in increments chosen so as to restore after each addition the original ratio of unchanged chloroprene to unchanged acrylic nitrile. There is also described therein a method for converting the residual acrylic nitrile into other interpolymers which increase the yield of the product without decreasing its solvent resistance, by adding a butadiene hydrocarbon after the chloroprene has been consumed and continuing the polymerization.

It is an object of this invention to provide a process for preparing synthetic elastomers by interpolymerizing chloroprene with vinylidine compounds wherein the excess vinylidine compounds that invariably remain after all of the chloroprene has been interpolymerized can be employed in the elastomer without impairing the desirable properties of the interpolymer, thereby obviating the necessity of removing the same.

I have found that, in the preparation of synthetic elastomers wherein chloroprene is interpolymerized with vinylidine compounds (those containing the grouping $CH_2=C<$), the excess vinylidine compounds which remain after all of the chloroprene has been interpolymerized can be polymerized with a butadiene hydrocarbon so that all of the vinylidine compound can be employed, and the properties of the chloroprene-vinylidine interpolymer are not materially affected. In this manner, all of the vinylidine compound is employed in the elastomer, so that its removal is made unnecessary.

In the synthetic elastomers to which the present invention relates, the second components are, more particularly, vinylidine compounds of the following types: vinyl aromatic hydrocarbons (such as styrene), the vinyl-ethynyl carbinols (such as dimethyl-vinyl-ethynyl carbinol), alpha, beta unsaturated ketones (such as methyl-vinyl ketone), the acrylic nitriles and esters and their alpha alkyl and alpha halogen substitution products (such as acrylic nitrile, methacrylic nitrile, butyl methacrylate and methyl chloracrylate), and the vinylidine halides (such as vinylidine chloride). Acrylic nitrile is particularly preferred. The interpolymerization of chloroprene with these compounds, comprising the first step of the process of the present invention, may be carried out either by having all of both components present at the start, or, preferably, by adding the chloroprene in increments which may, for example, be equal in size or may be adjusted so as to restore or maintain, with each addition, a constant ratio of unpolymerized chloroprene to unpolymerized second component, as described for acrylic nitrile in the copending application referred to above. The butadiene hydrocarbon is preferably added when substantially all of the chloroprene has been consumed. It is sometimes of practical advantage, however, for example when the last of the chloroprene polymerizes slowly, to add the hydrocarbon while some unpolymerized chloroprene still remains in the system. As brought out in connection with Example 1, however, when the isoprene was added at the start of the reaction along with the chloroprene and acrylic nitrile, the resulting product contained less acrylic nitrile and its kerosene absorption was even poorer than would be expected from the nitrile content. It is obvious, therefore, that most of the advantage of the process would be lost if the butadiene hydrocarbon were added when a large portion of the chloroprene was still unpolymerized. It is therefore preferred to add the butadiene hydrocarbon after at least 90% of the chloroprene has polymerized. On the other hand, it has already been explained how it is undesirable to allow the second component to polymerize by itself after the chloroprene has been consumed but before the addition of the butadiene hydrocarbon.

The following examples are given to illustrate the invention. The parts used are by weight.

*Example 1*

Chloroprene (70 parts) and 30 parts of acrylic nitrile containing 4 parts of oleic acid were emulsified in 144 parts of water containing 0.87 part of sodium hydroxide, 0.5 part of potassium persulfate, 0.25 part of potassium ferrocyanide and 0.5 part of the sodium salts of the dinaphthylmethane sulfonic acids prepared according to U. S. Patent 1,339,759. The temperature rose rapidly to about 43° C., due to the rapid initial polymerization. The dispersion was cooled to 30° C. and maintained at this temperature until the density reached 1.048. Isoprene (25 parts) containing 0.23 part of amyl mercaptan was then emulsified in the dispersion and the polymerization was continued to a density of 1.051. The dispersion was then stabilized by the addition of 2.5 parts of tetraethyl thiuram disulfide, 0.55 part of phenyl alpha-naphthylamine and 0.45 part of diphenyl amine dispersed in the same type of emulsifying agent as was used for the dispersion of the polymerizable compounds. The resulting dispersion was coagulated by freezing in a thin sheet according to the method described in U. S. Patent 2,187,146, then washed with water and dried by milling on a smooth mill. The yield was 90% of the total polymerizable materials used. Analysis showed the product to contain 61 parts of polymerized chloroprene, 20.5 parts of acrylic nitrile and 18.5 parts of polymerized isoprene, 77% of the acrylic nitrile being utilized. When 100 parts of this product was compounded with 2 parts of phenyl alpha-naphthylamine, 29 parts of semi-reinforcing carbon black, 0.5 part of stearic acid, 10 parts of extra light calcined magnesia, 10 parts of zinc oxide, and 1 part of the diorthotolyl guanidine salt of catechol borate and cured for 40 minutes at 153° C., a strong, highly elastic material resulted. When this was immersed in kerosene at 100° C. for 2 days, the increase in volume was only 24%.

The following comparisons show the superiority of the process of Example 1.

When the polymerization was interrupted before the addition of the isoprene, the yield was only 80%, the nitrile content 12.4% and the utilization 33%. The volume increase in kerosene when similarly compounded and cured was 34%.

When a mixture of the same quantities of chloroprene, nitrile, and isoprene as were used in the above example was polymerized as described therein but all were present from the start, the yield was 88.5% of a product containing 16.3% of combined nitrile, corresponding to a utilization of 60%. In spite of the fairly high nitrile content, a high kerosene absorption of 34% was obtained.

*Example 2*

Seventy (70) parts of chloroprene containing in solution 0.5 part of sulphur and 0.25 part of xylyl mercaptan (prepared by the reduction of commercial xylene sulfone chloride) were divided into four equal parts. One of these parts and 30 parts of acrylic nitrile were then dispersed in 150 parts of water containing 1 part of glacial acetic acid, 4 parts of the sodium salts of sulfated oleyl acetate and 0.5 part of the sodium salts of the dinaphthylmethane sulfonic acids described in Example 1. The polymerization was carried out at 40° C. until the density reached 0.986 corresponding to the polymerization of about 90% of the chloroprene. Another portion of the chloroprene solution was then dispersed in the resulting dispersion and the polymerization was continued to a density of 1.013. The third quarter of the chloroprene solution was then dispersed in the reaction mixture as before, and the polymerization was then continued to a density of 1.047 when the last quarter of the chloroprene solution was added. When the density reached 1.055 corresponding to the polymerization of about 90% of the last chloroprene addition, the dispersion was made alkaline with ammonium hydroxide; 0.3 part of potassium persulfate was added and 17.5 parts of isoprene containing 0.17 part of amyl mercaptan were emulsified in the dispersion and the polymerization was continued. The dispersion was worked up as in Example 1, yielding 90.6 parts of a product containing 20.4% of combined acrylic nitrile and 12.6% of combined isoprene. When compounded and cured as in Example 1, the increase in volume in kerosene was only 12%.

When the dispersion was worked up before the addition of the isoprene, the product contained only 16% of combined acrylic nitrile and swelled 14% in kerosene. The utilization of the acrylic nitrile was 77% when the isoprene was used, and only 46% without it. In the latter case the yield was 85%.

*Example 3*

An emulsifying solution was prepared by dissolving 8 parts of the sodium salt of sulfated oleyl acetate, two parts of the sodium salts of the dinaphthyl methane sulfonic acids described in Example 1, and two parts of acetic acid in 288 parts of water. In this were emulsified 50 parts of acrylic nitrile and 50 parts of a chloroprene solution made by dissolving 0.33 part of thio beta naphthol in 162 parts of chloroprene. The polymerization was carried out at 40° C. When the density of the dispersion reached 1.003, 36.4 parts of the chloroprene solution was emulsified therein and the polymerization was continued. The quantities of chloroprene added throughout were equal to the quantities of acrylic nitrile present in the unpolymerized state at each point as calculated from the composition (acrylic nitrile) of the polymeric product isolated and analyzed in previous identical experiments. When the density reached 1.025, 0.33 part of potassium persulfate dissolved in a little water was added, and then 30.2 parts of the chloroprene solution was emulsified as before. When the density reached 1.040, 25.0 more parts of the chloroprene solution were emulsified as before, and when the density reached 1.052, 20.7 parts were emulsified and the polymerization carried on to a density of 1.062. At this point the dispersion was neutralized by the addition of ordinary concentrated ammonia solution, and then made alkaline by the addition of 3 parts more. Potassium ferricyanide (0.09 part) and potassium persulfate (0.12 part) were then added to the dispersion, and 28.3 parts of isoprene containing 0.12 part of pinene mercaptan were emulsified therein. The polymerization was then continued at 30° C., the same quantities of potassium persulfate being added again when the density of the dispersion, which had been considerably reduced by the addition of the isoprene, reached 1.050 and 1.055. The polymerization was continued until the density was 1.067. The yield was 96.6% of the total weight of all the polymerizable materials used. The product contained 69.8% of polymerized chloroprene, 19.7% of polymerized acrylic nitrile and 10.5% of polymerized isoprene. 91.6% of the acrylic nitrile was utilized.

While in the examples the invention has been illustrated by the preparation of interpolymers of chloroprene with acrylic nitrile, it is of course understood that the invention contemplates interpolymerization of chloroprene with other polymerizable compounds, more particularly vinylidine compounds of the types listed above, of which the chloroprene-styrene and the chloroprene-vinylidine chloride interpolymers are of particular interest. The vinylidine compounds contemplated in this invention are those which contain only one vinylidine group. In the preparation of predominantly rubber-like materials having high resistance to swelling in organic solvents, the monomeric vinylidine compound is preferably employed in an amount of from 15% to 40% of the total monomeric material used, and the polymerization is carried out in such a manner that the interpolymer of chloroprene and vinylidine compound, prior to the addition of the butadiene hydrocarbon, contains at least 10%, and preferably more than 15%, of combined vinylidine compound.

The proportion of butadiene hydrocarbon employed in the above examples may of course be varied, although it is preferred, particularly where isoprene is used to complete the polymerization, to add a weight of the isoprene approximately equal to from 100% to 150% of the weight of the unchanged acrylic nitrile or other second component to be polymerized.

Apparently because of the ease with which the chloroprene polymerizes when it is interpolymerized with second components as above described, and when all of the chloroprene is added at once, the resulting interpolymer contains a much higher proportion of chloroprene than is contained in the original mixture of monomers. The butadiene hydrocarbons, however, have been found to interpolymerize with acrylic nitrile and the other second components in substantially the same proportions in which they are originally mixed as monomers, and therefore it is unnecessary to add an excess of a third component over that of the unchanged monomer of the second component which exists at the end of the polymerization with the chloroprene.

The butadiene hydrocarbon which is to be interpolymerized with the unreacted second component (vinylidine compound) may be either 1,3-butadiene itself, or any other aliphatic 1,3-butadiene containing not more than six carbon atoms, and more particularly the beta methyl-substituted 1,3-butadienes such as isoprene and 2,3-dimethyl-1,3-butadiene.

In general, any of the known processes for the preparation and processing of the polymers and interpolymers of chloroprene and butadiene hydrocarbons may be applied to the interpolymers of the present process. Thus, among many others, the processes disclosed in U. S. Patents 2,163,250, 2,227,517 (as used in Example 3 of the present application), 2,234,215 (as used in Example 2), and 2,264,173 may be used for obtaining more plastic products in the step involving the polymerization of the chloroprene. Similarly, for the step involving the polymerization of the butadiene hydrocarbon, the process of U. S. Patent 2,234,204 may be used to advantage for obtaining a plastic product. Similarly, the water soluble complex cyanides such as the ferricyanides, cobalticyanides, nickelicyanides, molybdicyanides, mercuricyanides, complex cyanides of zinc, copper, and silver, mixtures of such complex cyanides, and compounds which are capable of yielding such complex cyanides under the reaction conditions, of U. S. Patent application Serial No. 445,219, filed May 30, 1942, and the method of controlling the polymerization by decreasing the amount of oxygen in contact with the polymerization mass as disclosed in Serial No. 464,081, filed October 31, 1942, may be used to accelerate and control the polymerization reaction of the present process. It is preferred to have the dispersion alkaline during the polymerization of the butadiene hydrocarbon. The discussion of such matters as the purity of the chloroprene, the type and quality of the emulsifying agent used, the catalysts employed, the temperature of polymerization, the concentration of the emulsion to be used, the stabilization, coagulation, washing and drying of the finished product and its plasticizing, compounding, curing and utilization given in these patents and elsewhere in the prior art, may be applied. The present invention is not limited to any particular method of carrying out any of the above operations.

I claim:

1. In the process for preparing interpolymers of chloroprene with vinylidine compounds by emulsion polymerization of the monomers wherein some of the vinylidine compound monomer remains unpolymerized after substantially all of the chloroprene has been polymerized, the step which comprises adding an aliphatic 1,3-butadiene hydrocarbon containing not more than 6 carbon atoms to the emulsion when at least 90% of the chloroprene has been polymerized and before any homopolymer of the vinylidine compound is formed, and completing the polymerization, whereby the resulting product contains no homopolymer of the vinylidine compound and removal of the unused vinyidine compound monomer is made unnecessary, the amount of butadiene hydrocarbon employed being equal to from 100% to 150% by weight of the remaining vinylidine monomer.

2. In the process for preparing interpolymers of chloroprene with vinylidine compounds by emulsion polymerization of the monomers wherein the vinylidine compound monomer comprises from 15% to 40% of the total monomeric material used and wherein some of the vinylidine compound monomer remains unpolymerized after substantially all of the chloroprene has been polymerized, the step which comprises adding an aliphatic 1,3-butadiene hydrocarbon containing not more than 6 carbon atoms of the emulsion when at least 90% of the chloroprene has been polymerized and before any homopolymer of the vinylidine compound is formed, and completing the polymerization, whereby the resulting product contains no homopolymer of the vinylidine compound and removal of the unused vinylidine compound monomer is made unnecessary, the amount of butadiene hydrocarbon employed being equal to from 100% to 150% by weight of the remaining vinylidine monomer.

3. In the process for preparing interpolymers of chloroprene and acrylic nitrile by emulsion polymerization of the monomers wherein the acrylic nitrile monomer employed is equal to from 15% to 40% of the total monomeric material used and wherein some of the acrylic nitrile monomer remains unpolymerized after substantially all of the chloroprene has been polymerized, the step which comprises adding an aliphatic 1,3-butadiene hydrocarbon containing not more than 6 carbon atoms to the emulsion when at least 90% of the chloroprene has been polymerized and before any homopolymer of acrylic nitrile is formed and completing the polymerization, whereby the resulting product contains no homopolymer of the acrylic nitrile and removal of the unused acrylic nitrile monomer is unnecessary, the amount of butadiene hydrocarbon employed being equal to from 100% to 150% by weight of the remaining acrylic nitrile.

4. In the process for preparing interpolymers of chloroprene and acrylic nitrile by emulsion polymerization of the monomers wherein the acrylic nitrile monomer employed is usual to from 15% to 40% of the total monomeric material used and wherein some of the acrylic nitrile monomer remains unpolymerized after substantially all of the chloroprene has been polymerized, the step which comprises adding 1,3-butadiene to the emulsion when at least 90% of the chloroprene has been polymerized and before any homopolymer of acrylic nitrile is formed and completing the polymerization, whereby the resulting product contains no homopolymer of the acrylic nitrile and removal of the unused acrylic nitrile monomer is unnecessary, the amount of 1,3-butadiene employed being equal to from 100% to 150% by weight of the remaining acrylic nitrile.

5. In the process for preparing interpolymers of chloroprene and acrylic nitrile by emulsion polymerization of the monomers wherein the acrylic nitrile monomer employed is equal to from 15% to 40% of the total monomeric material used and wherein some of the acrylic nitrile monomer remains unpolymerized after substantially all of the chloroprene has been polymerized, the step which comprises adding isoprene to the emulsion when at least 90% of the chloroprene has been polymerized and before any homopolymer of acrylic nitrile is formed and completing the polymerization, whereby the resulting product contains no homopolymer of the acrylic nitrile and removal of the unused acrylic nitrile monomer is unnecessary, the amount of isoprene employed being equal to from 100% to 150% by weight of the remaining acrylic nitrile.

FREDERICK C. WAGNER.

Certificate of Correction

Patent No. 2,399,407. April 30, 1946.

FREDERICK C. WAGNER

It is hereby certified that errors appear in the printed specification of the above numbered patent requiring correction as follows: Page 3, first column, line 66, for "mired" read *mixed*; page 4, first column, line 1, claim 2, for "atoms of" read *atoms to*; line 35, claim 4, for "usual" read *equal*; and that the said Letters Patent should be read with these corrections therein that the same may conform to the record of the case in the Patent Office.

Signed and sealed this 18th day of June, A. D. 1946.

[SEAL]

LESLIE FRAZER,
*First Assistant Commissioner of Patents.* ing not more than 6 carbon atoms of the emulsion when at least 90% of the chloroprene has been polymerized and before any homopolymer of the vinylidine compound is formed, and completing the polymerization, whereby the resulting product contains no homopolymer of the vinylidine compound and removal of the unused vinylidine compound monomer is made unnecessary, the amount of butadiene hydrocarbon employed being equal to from 100% to 150% by weight of the remaining vinylidine monomer.

3. In the process for preparing interpolymers of chloroprene and acrylic nitrile by emulsion polymerization of the monomers wherein the acrylic nitrile monomer employed is equal to from 15% to 40% of the total monomeric material used and wherein some of the acrylic nitrile monomer remains unpolymerized after substantially all of the chloroprene has been polymerized, the step which comprises adding an aliphatic 1,3-butadiene hydrocarbon containing not more than 6 carbon atoms to the emulsion when at least 90% of the chloroprene has been polymerized and before any homopolymer of acrylic nitrile is formed and completing the polymerization, whereby the resulting product contains no homopolymer of the acrylic nitrile and removal of the unused acrylic nitrile monomer is unnecessary, the amount of butadiene hydrocarbon employed being equal to from 100% to 150% by weight of the remaining acrylic nitrile.

4. In the process for preparing interpolymers of chloroprene and acrylic nitrile by emulsion polymerization of the monomers wherein the acrylic nitrile monomer employed is usual to from 15% to 40% of the total monomeric material used and wherein some of the acrylic nitrile monomer remains unpolymerized after substantially all of the chloroprene has been polymerized, the step which comprises adding 1,3-butadiene to the emulsion when at least 90% of the chloroprene has been polymerized and before any homopolymer of acrylic nitrile is formed and completing the polymerization, whereby the resulting product contains no homopolymer of the acrylic nitrile and removal of the unused acrylic nitrile monomer is unnecessary, the amount of 1,3-butadiene employed being equal to from 100% to 150% by weight of the remaining acrylic nitrile.

5. In the process for preparing interpolymers of chloroprene and acrylic nitrile by emulsion polymerization of the monomers wherein the acrylic nitrile monomer employed is equal to from 15% to 40% of the total monomeric material used and wherein some of the acrylic nitrile monomer remains unpolymerized after substantially all of the chloroprene has been polymerized, the step which comprises adding isoprene to the emulsion when at least 90% of the chloroprene has been polymerized and before any homopolymer of acrylic nitrile is formed and completing the polymerization, whereby the resulting product contains no homopolymer of the acrylic nitrile and removal of the unused acrylic nitrile monomer is unnecessary, the amount of isoprene employed being equal to from 100% to 150% by weight of the remaining acrylic nitrile.

FREDERICK C. WAGNER.

Certificate of Correction

Patent No. 2,399,407. April 30, 1946.

FREDERICK C. WAGNER

It is hereby certified that errors appear in the printed specification of the above numbered patent requiring correction as follows: Page 3, first column, line 66, for "mired" read *mixed*; page 4, first column, line 1, claim 2, for "atoms of" read *atoms to*; line 35, claim 4, for "usual" read *equal*; and that the said Letters Patent should be read with these corrections therein that the same may conform to the record of the case in the Patent Office.

Signed and sealed this 18th day of June, A. D. 1946.

[SEAL]

LESLIE FRAZER,
*First Assistant Commissioner of Patents.*